United States Patent [19]
Hoffman

[11] Patent Number: 5,599,426
[45] Date of Patent: Feb. 4, 1997

[54] METHOD OF WASHING PULP USING A SINGLE ENDLESS SUPPORT FABRIC

[75] Inventor: Roger P. Hoffman, Green Bay, Wis.

[73] Assignee: Hoffman Environmental Systems, Inc., Green Bay, Wis.

[21] Appl. No.: 320,576

[22] Filed: Oct. 11, 1994

[51] Int. Cl.⁶ .................................................. D21C 9/02
[52] U.S. Cl. .................................................. 162/60; 162/4
[58] Field of Search .................................. 162/60, 4, 363, 162/368, 367; 68/158, 205 R; 8/156; 209/381, 382

[56] References Cited

U.S. PATENT DOCUMENTS

| | | |
|---|---|---|
| 2,356,285 | 8/1944 | Street . |
| 3,065,789 | 11/1962 | Beachler et al. ........................ 162/363 |
| 4,680,088 | 7/1987 | Bastanzuri ................................. 162/4 |
| 4,686,005 | 8/1987 | Biondetti et al. ......................... 162/56 |
| 4,722,793 | 2/1988 | Seifert et al. ............................. 162/55 |

OTHER PUBLICATIONS

Gilkey et, "A New Device For High Efficiency Washing of Deink Furnishes" 1988 Pulping Conference, New Orleans, LA, Oct. 30–Nov. 2 in TAPPI Proceedings (Atlanta, Ga, TAPPI Press, 1988), Book 3 pp. 649–654.

Primary Examiner—Brenda A. Lamb
Attorney, Agent, or Firm—Andrus, Sceales, Starke & Sawall

[57] ABSTRACT

A method of washing cellulosic pulp to remove dissolved solids as well as dirt, inorganic fillers and fiber debris from the pulp. A thin mat of cellulosic pulp having a weight of 3 to 100 pounds of dry fiber per 1000 sq. ft. is applied to the upper surface of a porous, endless belt or fabric. The belt containing the pulp mat is moved in a generally horizontal path, and as it is moved in this path wash water is directed against the exposed upper surface of the mat through a series of longitudinally spaced showers to thereby impregnate the mat with wash water. Water removal devices, preferably table rolls, are located beneath the belt and downstream in the direction of travel from each shower to thereby remove the wash water from the mat. After moving through the path of travel, the washed pulp is removed from the belt, and the wash water removed from the mat can be used in other portions of the papermaking process.

5 Claims, 1 Drawing Sheet

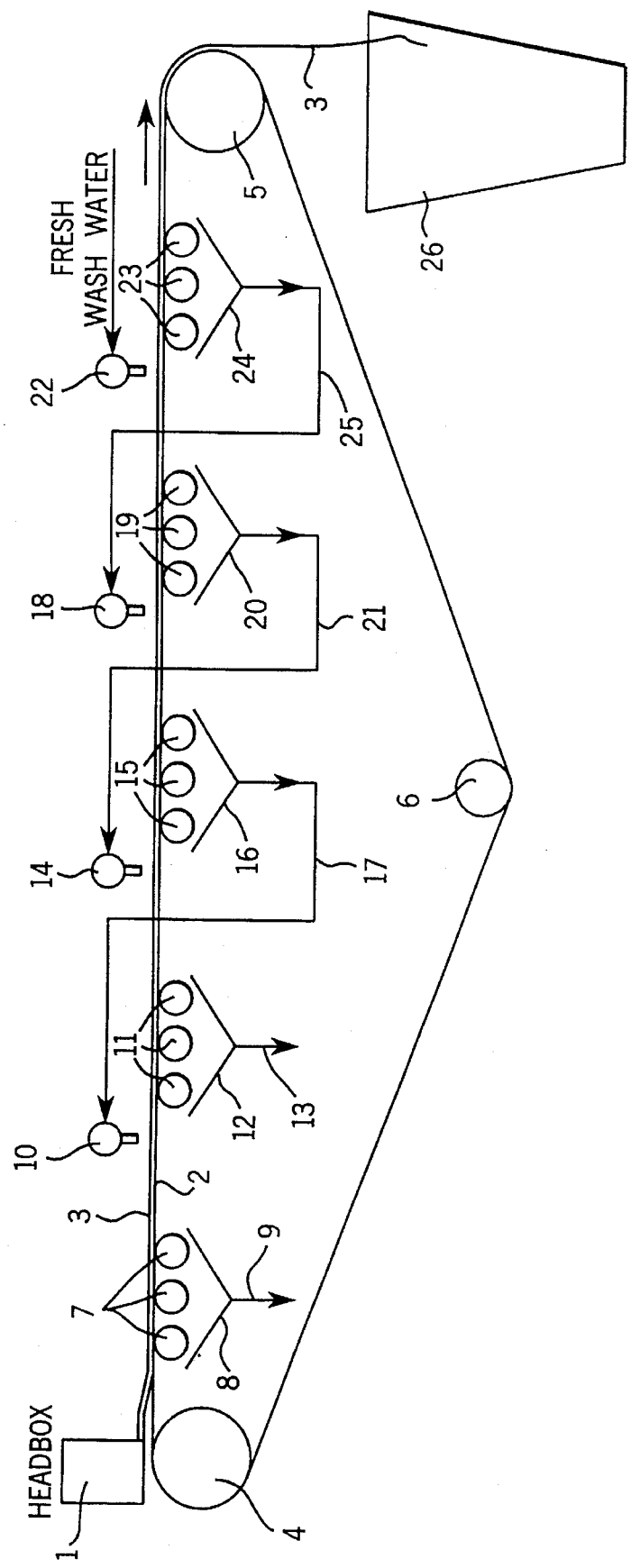

METHOD OF WASHING PULP USING A SINGLE ENDLESS SUPPORT FABRIC

BACKGROUND OF THE INVENTION

In a typical virgin pulp papermaking process, the pulp, after pulping, is subjected to a series of cleaning operations to remove debris and larger particulate material. The pulp is then subjected to a washing process to remove the dissolved solids generated by the chemicals used in the pulping process. In the past, virgin pulp has been washed using either a drum washing process or a belt washing process. In a drum washing process, a drum having perforated outer sections is partially submerged in the pulp and a vacuum drawn on the inside of the drum, causing a relatively thick layer of pulp to adhere to the outer surface of the rotating drum. As the drum rotates, the mat or layer of pulp is showered with water and the vacuum on the inside of the drum draws the water through the mat. In a typical washing operation, three to five stages of drum washing are utilized.

In a belt washing process, a mat of virgin pulp is fed onto an endless porous belt or fabric and wash water is sprayed onto the mat. The fabric is dewatered by vacuum boxes located beneath the fabric. In a typical operation, five stages of washing may be employed in an attempt to remove the dissolved solvents from the virgin pulp. After washing, the virgin pulp may still contain a significant quantity of dissolved solids, and because of the nature of washing utilizing very thick pulp mats, dirt and fiber debris are also present in the conventionally washed virgin pulp.

Recycled pulp, composed of used corrugated containers, waste paper, white office waste and the like, cannot successfully be washed in the same manner as virgin pulp, because of the presence of inorganic fillers, such as clay and calcium carbonate, in the recycled pulp.

In the conventional drum and belt washing processes, as described above, the pulp mats are relatively thick. Because of the thickness of the mat, it is difficult to remove small particles of the fillers, since the pulp mat acts like a filter and entraps the filler particles.

Consequently, pulp washing of recycled fiber has been done with a side hill screen or unit known as a "Variosplit". With the use of the side hill screen, the pulp is diluted with a tremendous quantity of water and is flowed over the screen. While a side hill screen will act to remove dissolved solids as well as fillers, unfortunately a substantial quantity of small fibers are carried through in the liquid stream. To remove the inorganic filler and small fibers from the liquid stream, a large flotation clarifier is normally utilized.

In the clarifier, air and a coagulative polymer are added to the liquid, resulting in a sludge that floats to the top of the vessel and typically contains from about 60% to 80% of potentially usable fibers, with the remainder being short fibers and fillers. This sludge is further dewatered and traditionally has been landfilled.

Additionally, since only one or two stages of this type of washing are typically employed a large quantity of wash water is required in order to effect a significant reduction in dissolved solids.

Thus, the conventional process for washing recycled pulp not only utilize a tremendous quantity of water, but result in a substantial loss of good fiber material. Further, washing of recycled pulp has been very inefficient in removing dissolved solids, since significant quantities of wash water are required.

SUMMARY OF THE INVENTION

The invention is directed to a process for washing pulp and has particular application to washing recycled pulp. The process of the invention removes dissolved solids generated by the chemicals used in the pulping process, as well as inorganic particles and fillers with a minimum quantity of wash water.

In accordance with the invention, a thin mat of pulp having a weight of 3 to 100 pounds of dry fiber per 1000 sq. ft. is applied to the upper surface of a porous, endless fabric or belt. The belt, along with the supported mat of pulp, is moved in a generally horizontal path of travel, and as it is moved in this path, wash water is directed against the exposed upper surface of the mat through a series of showers that are spaced along the length of the path of travel.

Water removal devices, preferably in the form of rotatable table rolls, are located beneath the belt and downstream in the direction of travel from each shower.

As the belt approaches each table roll, a pressure increase is created in the area between the roll and the belt, and as the belt breaks away from the roll a subatmospheric pressure or vacuum is created, which acts to draw water from the mat. Thus, the pulp mat is alternately subjected to pressure and vacuum pulses. As the belt is traveling at high speeds, generally in the range of 300 to 4000 feet per minute, and preferably above 1000 feet per minute, the alternating pressure and vacuum pulses produce "stock jump". Stock jump is normally an action to be avoided in papermaking. However, in pulp washing the "stock jump" aids in flushing the wash water through the thin mat to thereby remove the inorganic fillers from the mat.

The washing process of the invention removes fillers and dissolved solids from the pulp mat, while utilizing a minimum quantity of water as compared with conventional recycled pulp washing operations.

The wash water being discharged from the pulp washing process can be recycled and used in the pulping operation. This results in an overall decrease in water consumption in the papermaking process.

Other objects and advantages will appear in the course of the following description.

DESCRIPTION OF THE DRAWING

The drawing illustrates the best mode presently contemplated of carrying out the invention.

In the drawing:

The drawing is a schematic representation of the apparatus used to carry out the method of the invention.

DESCRIPTION OF THE ILLUSTRATED EMBODIMENT

The invention is directed to a process for washing cellulosic pulp and has particular use in washing recycled pulp composed of material such as used corrugated cartons, waste paper, white office waste and the like. The recycled material contains fiber debris, dirt and inorganic fillers, such as clay and calcium carbonate, in addition to dissolved solids such as alum and sodium salts.

As shown in the drawing, a pulp prepared by conventional pulping techniques, and having a solids content of about 0.3% to 2.0% by weight, and preferably about 0.4% to 1.0% by weight, is fed from a head box 1 onto a the upper surface of a porous belt or fabric 2 in the form of a very thin mat 3.

The mat has a basis weight in the range of 3 to 100 pounds of dry fiber per 1000 sq. ft. and preferably 5 to 30 pounds of dry fiber per 1000 sq. ft. Belt 2 preferably has a mesh size of about 25 to 70.

Belt 2 travels in an upper horizontal run from an idler roll 4 to a drive roll 5, and the lower run of the belt passes over a roll 6.

A series of freely rotatable table rolls 7 are mounted downstream of head box 1, and as the pulp mat 3 travels over the table rolls 7, a portion of the water in the pulp slurry is removed and collected in trough 8. The water collected in trough 8 can be pumped through conduit 9 and used in the pulping operation.

Located downstream of table roll 7 is a shower 10 through which wash water is sprayed or distributed onto the upper exposed surface of pulp mat 3 and penetrates into the mat.

A second series of table rolls 11 are positioned beneath belt 2 and located immediately downstream of shower 10. Table rolls 11 again function to remove water from the pulp mat and the removed water is collected in trough 12. The collected water can then be pumped through conduit 13 and used in the pulping operation.

Located downstream of table rolls 11 is a shower 14 which serves to spray wash water on the upper surface of the pulp mat, and a third group of table rolls 15, similar to rolls 7 and 11, are mounted beneath the belt immediately downstream of shower 14. Rolls 15 serve to remove the wash water from the pulp mat, and the wash water is collected in trough 16 and then pumped through conduit 17 to the shower 10.

As shown in the drawing, a shower 18 is located downstream of table rolls 15 and also serves to impinge wash water against the upper surface of the pulp mat 3 and the water then penetrates the mat. A series of table rolls 19 are mounted beneath the belt 2 downstream of shower 18 and in the manner previously described, serve to remove water from the mat and the water is collected in trough 20. Conduit 21 connects the trough 20 with the upstream shower 14 so that the wash water is recycled upstream to that shower.

Water shower 22, similar to showers 10, 14 and 18, is located downstream of table rolls 19, while a further series of table rolls 23 are mounted beneath the belt downstream of shower 22. The water removed by table rolls 23 is collected in trough 24 and is recycled through conduit 25 to shower 18.

As the pulp mat 3 reaches the end of the upper run of belt 2, the mat will be thrown from roll 5 by centrifugal force into a collection chute 26. After leaving drive roll 5, the belt can travel over a smooth surface roll located between rolls 5 and 6 and any pulp mat still adhering to belt 2 will adhere to the smooth surface roll and be removed therefrom by a doctor blade.

As previously noted, the pulp slurry fed from head box 1 onto belt 2, has a low consistency in the range of 0.3 to 2.0% solids. This consistency is substantially below the normal consistency used in prior belt washing devices which normally would be in the range of 8 to 12% solids.

As the pulp mat 3 passes over the table rolls 7, the consistency is increased. For example, if the pulp being discharged from the head box has a consistency of about 1% solids, the consistency will be increased to perhaps 4% as the mat 3 passes over table rolls 7. The consistency will then be decreased as water is applied to the mat through shower 10 to a value of perhaps 2%, and the consistency will then again be increased to perhaps 4% as the mat passes across the table rolls 11.

Thus, the consistency or percent solids of the pulp mat is alternately increased and decreased as it passes through the horizontal path of travel on belt 2.

The speed of travel of belt 2 is in the range of 300 to 4000 feet per minute, and preferably greater than 1000 feet per minute. This speed is substantially greater than the belt speed used in conventional pulp washers, which is usually in the range of about 30 to 150 feet per minute.

As the belt approaches each table roll, a pressure increase is created in the area between the roll and the belt 3, which will tend to move the water in the mat upwardly away from the supporting belt 2. As the belt breaks away from the table roll, a negative pressure or vacuum is created in the area between the roll and the belt, which tends to draw water from the mat downwardly for collection in the corresponding trough. At the high speed of operation as used in the invention, the alternate pressure pulses followed by vacuum pulses produce an action which is commonly referred to as "stock jump". While "stock jump" is an action that is to be avoided in most papermaking operations, "stock jump" is, in effect, beneficial to the pulp washing action of the invention, in that it aids in removing the inorganic fillers from the pulp.

Due to the thin mat, the low consistency, the high speed, and the use of the table rolls, there is less tension on the belt than in a conventional system utilizing a thick mat and vacuum boxes.

The washing process of the invention serves to remove dissolved solids as well as inorganic fillers from the pulp mat, while utilizing a minimum quantity of water as compared with conventional recycled pulp washing operations. Further, the water being discharged from the washing operation can be used in pulping, thus decreasing the overall water consumption for the papermaking process.

While the above description shows the use of table rolls as the preferred device for removing water from the pulp mat, it is contemplated that other water removal devices, such as foils or suction boxes, can be utilized, or a combination of such devices can be used.

Various modes of carrying out the invention are contemplated as being within the scope of the following claims particularly pointing out and distinctly claiming the subject matter which is regarded as the invention.

I claim:

1. A method of washing recycled cellulosic pulp, comprising the steps of forming an aqueous slurry of recycled cellulosic pulp containing inorganic solid fillers and dissolved solids, applying the slurry to the upper surface of a porous belt to provide a pulp mat having a basis weight of 3 to 100 lbs. of dry fiber per 1,000 sq. ft. of mat surface, moving the belt and the mat supported thereon in a path of travel, directing wash water against an exposed upper surface of the mat, moving the belt and the mat supported thereon at a speed of 300 to 400 ft. per minute over a series of spaced idler table rolls to cause the belt and the supported mat to jump vertically to remove the water along with said dissolved solids and said fillers from the mat, and thereafter removing the mat from the belt.

2. The method of claim 1, wherein said aqueous slurry has a consistency in the range of 0.3% to 2.0% by weight of solids.

3. A method of washing recycled cellulosic pulp, comprising the steps of forming an aqueous slurry of recycled cellulosic pulp containing inorganic solid fillers and dissolved solids, applying the slurry to an upper surface of a porous movable belt to provide a mat having a basis weight of 3 to 100 lbs. of dry fiber per 1,000 sq. ft of mat surface, maintaining the upper surface of the mat exposed to the atmosphere, moving the belt and the mat supported thereon in a generally horizontal path of travel, directing wash water against the exposed upper surface of the mat through a series of water showers spaced at intervals along the length of said path of travel, moving the belt and the mat supported thereon at a speed greater than 1,000 ft. per minute over a series of spaced idler table rolls to cause said belt and the mat supported thereon to jump vertically as the belt passes over said table rolls to thereby remove the water along with said dissolved solids and said fillers from the mat.

4. The method of claim 3, and including the step of positioning one of said table rolls downstream of each water shower.

5. The method of claim 3, wherein the mat has a basis weight of 5 lbs. to 30 lbs. of dry fiber per 1,000 sq. ft. of mat surface.

* * * * *

UNITED STATES PATENT AND TRADEMARK OFFICE
CERTIFICATE OF CORRECTION

PATENT NO. : 5,599,426
DATED : February 4, 1997
INVENTOR(S) : ROGER P. HOFFMAN

It is certified that error appears in the above-indentified patent and that said Letters Patent is hereby corrected as shown below:

Col. 4　Line 66　Cancel "400 ft." and substitute therefor ---4,000 ft.---

Col. 4　Line 65　Before "mat" cancel "supported"

Col. 5　Line 1　After "mat" insert ---supported thereon---

Signed and Sealed this

Fifteenth Day of July, 1997

*Attest:*

BRUCE LEHMAN

*Attesting Officer*　　Commissioner of Patents and Trademarks